United States Patent [19]

Blais

[11] Patent Number: 5,270,795
[45] Date of Patent: Dec. 14, 1993

[54] VALIDATION OF OPTICAL RANGING OF A TARGET SURFACE IN A CLUTTERED ENVIRONMENT

[75] Inventor: Francois Blais, Orleans, Canada

[73] Assignee: National Research Council of Canada/Conseil National de Rechereches du Canada, Ottawa, Canada

[21] Appl. No.: 925,457

[22] Filed: Aug. 11, 1992

[51] Int. Cl.$^5$ ............................................. G01B 11/24
[52] U.S. Cl. ................................... 356/375; 356/376; 356/1
[58] Field of Search ........................... 356/1, 375, 376; 250/201.4, 201.6, 201.8

[56] References Cited

U.S. PATENT DOCUMENTS

| | | | |
|---|---|---|---|
| 4,645,347 | 2/1987 | Rioux | 356/376 |
| 4,767,934 | 8/1988 | Stauffer | 356/375 |
| 4,819,197 | 4/1989 | Blais | 364/715.06 |
| 4,874,246 | 10/1989 | Den Boef | 356/375 |
| 5,018,854 | 5/1991 | Rioux | 356/375 |
| 5,168,327 | 12/1992 | Yamawaki | 356/376 |

FOREIGN PATENT DOCUMENTS 0370770  5/1990  European Pat. Off. .

OTHER PUBLICATIONS

F. Blais et al., "Practical Considerations for a Design of a High Precision 3-D Laser Scanner System", Optomechanical and Electro-optical Design of Industrial Systems, SPIE vol. 959, 1988, pp. 225–246.

F. Blais et al., "Optical Range Image Acquisition for the Navigation of a Mobile Robot", Proceedings of the 1991 IEEE International Conference on Robotics and Automation, Sacramento, Calif., Apr. 9–11, 1991.

M. Rioux et al., "Compact Three-Dimensional Camera for Robotic Applications", Journal of the Optical Society of America A., vol. 3, p. 1518, Sep. 1986.

Primary Examiner—F. L. Evans

[57] ABSTRACT

To provide a system for the optical ranging of a selected point on a target surface irradiated with light while avoiding false signals from other sources in a cluttered environment, the system employs a combination of the triangulation ranging technique with the Biris ranging technique, i.e. imaging onto a position sensitive photodetector through an apertured mask. This combination enables the respective equations for range that apply to the respective techniques to be combined to generate an equation that is true only for target surface points that are directly on the light beam, hence enabling rejection of false signals on the basis of those that fail to satisfy this latter equation. The system has the advantage of flexibility, in that it permits the light beam to be directed onto the target surface from a wide range of locations relative to the detector. In addition, three dimensional data on the target surface can be obtained by using at least one further light beam inclined to the first beam and a mask with more than two apertures. For many practical applications this latter arrangement avoids a need to scan the target surface relative to the detector.

9 Claims, 4 Drawing Sheets

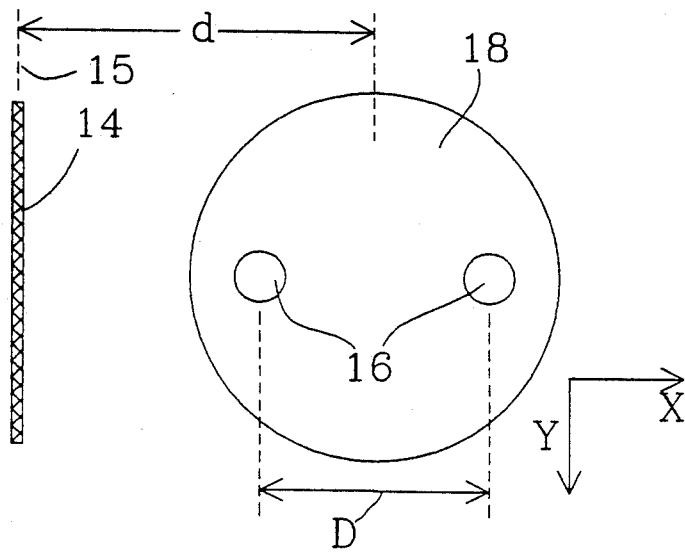
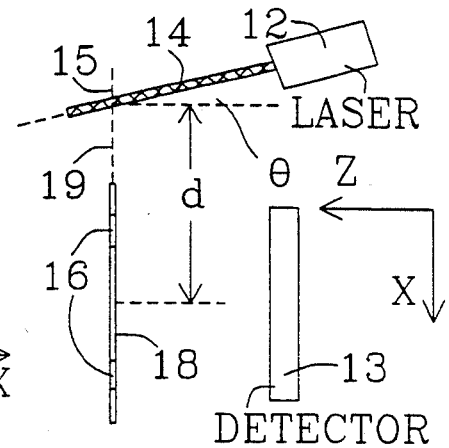
FIG.4
FIG.5
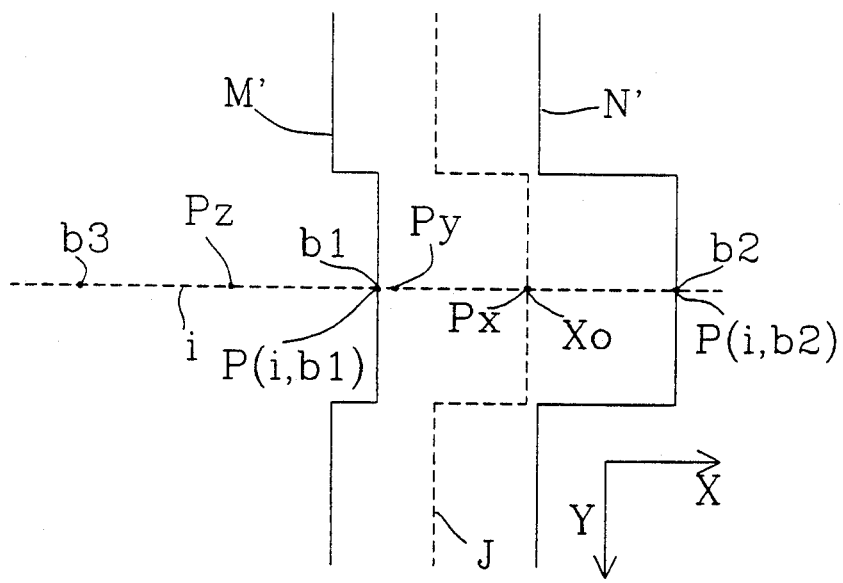
FIG.6

VALIDATION OF OPTICAL RANGING OF A TARGET SURFACE IN A CLUTTERED ENVIRONMENT

FIELD OF THE INVENTION

The invention relates to a system for the optical ranging of points on a target surface and in particular to the validation of such ranging in a cluttered environment, i.e. an environment containing at least one other surface in the general vicinity of the target surface or some other perturbation such as light coming from another source, that can be seen by the detector and may interfere with the ranging process by generating false signals.

BACKGROUND OF THE INVENTION

Two popular techniques currently in use for optical ranging of a target surface are known, respectively, as the standard optical triangulation system and the Biris (bi-iris) system, the latter employing an apertured mask in a converging lens system of an imaging device having a position sensitive detector, e.g. a CCD camera.

These systems are described and compared in F. Blais et al. (88), i.e. "Practical Considerations for a Design of a High Precision 3-D Laser Scanner System", published in Optomechanical and Electro-optical Design of Industrial Systems, SPIE Vol. 959, 1988, pp 225–246, and also in F. Blais et al. (91), i.e. "Optical Range Image Acquisition for the Navigation of a Mobile Robot", published in the Proceedings of the 1991 IEEE International Conference on Robotics and Automation, Sacramento, California, Apr. 9–11, 1991. The Biris system had previously been reported by M. Rioux et al. (86) in "Compact Three-Dimensional Camera For Robotic Applications", published in the Journal of the Optical Society of America A, Vol. 3, p 1518, September 1986, and in M. Rioux U.S. Pat. No. 4,645,347 issued Feb. 24, 1987. All these documents are hereby incorporated herein by reference.

An advantage of the Biris system is its small size and the robustness of the range sensor. On the other hand, the triangulation system can achieve greater accuracy than the Biris system, but is very sensitive to the condition of the environment. It operates well in a highly controlled environment, but fails in more complex situations. For example, if the target surface is reflective and reflects light onto one or more non-target objects in the vicinity of the target surface, or there are other perturbations, such as reflections or light from an open window, that enter the field of view of the camera, the detector becomes confused and cannot discriminate between the true target surface and false signals from the other objects or perturbations. The Biris system is better than the triangulation system in this respect, because it uses the redundancy introduced by an apertured mask to validate the measurements, but nevertheless in a severely cluttered environment both systems are subject to error. FIG. 2 of Blais et al. (91) shows the difference between the images obtained by the respective systems in a cluttered environment.

PRIOR ART

FIG. 1 shows the basic arrangement of a typical conventional Biris system, namely a camera 10 containing a position sensitive photodetector, e.g. a CCD, and in its lens system a mask 18 with two apertures 16 (FIG. 2), the plane of the mask and the plane of the lens being preferably the same and referred to below as the mask plane. There is also a laser 12 mounted on the camera 10. The laser 12 can be a CW laser or a pulsed laser, the latter being especially useful when the target surface is moving, in order to arrest the movement. The laser will either be such as to generate a diverging strip-like beam 14 (typically having a width of no more than about 1 mm at a range of 1 m) or a small point beam (not shown) that is scanned up and down in a line (in the Y direction) so as to trace out the equivalent of the thin strip beam 14 and hence define a vertical beam plane 15. FIG. 2 shows the relationship between the beam 14 taken at the mask plane and the apertures 16 in the mask 8. The beam plane 15 is centrally located in the X direction in relation to the apertures 16, i.e. it is perpendicular to a line joining the apertures and equidistant between such apertures. If desired, an incandescent light source can replace the laser.

As explained in the Rioux patent (FIG. 2A), this system can use an annular aperture, subject to the fact that in this case the laser beam 14 will be required to be a point beam. Since an annular aperture is equivalent to a number of annularly distributed apertures, the broad definition of the invention refers to aperture portions which may be individual apertures or parts of an annular aperture.

The beam 14 is assumed to irradiate a target surface 20 having a central projecting portion 22. The resultant return image produced in the detector in the camera 10 is as shown in FIG. 3 (compare FIG. 3 of the Rioux patent), the spacing b between a pair of image spots b1 and b2 on the position sensitive detector in the camera (or b' between spots b1' and b2') on lines M and N providing the Z coordinate (range) data for each position in the Y direction. Compare the spacing b representing the Z coordinate of a point B on the projecting target portion 22 with the spacing b' between spots b1' and b2' representing the Z coordinate of a point B' on the main portion of the target surface 20. As explained below in greater detail, the Z coordinate is inversely proportional to the value of the spacing b plus a constant. This result is explained in more detail in the Rioux patent and the other publications referred to above. Variations in the values of the Z coordinate in the X direction have traditionally been obtained by relative scanning of the beam 14 and the surface 20 in the X direction, but, as indicated below, the present invention includes a feature that can in some circumstances obviate the need for this X direction scanning by the use of multiple beams.

The output of the camera 10 is fed to a computer system 28 which also controls the laser 12. At this point in the description, it is appropriate to refer to F. Blais U.S. Pat. No.4,819,197 issued Apr. 4, 1989 (the contents of which are also incorporated herein by reference), which describes a circuit for detecting the positions of peaks in an input signal. As is explained in this Blais patent beginning at line 60 in column 3, the circuit is well adapted for interpreting the data obtained by a Biris type imaging device of the type described in the Rioux patent and may be embodied in the computer system 28. As best illustrated in FIG. 4 of the Blais patent the solid vertical lines M and N contain peaks l and k that are to be detected along a typical X direction scan line i. The scan line i is an X direction scanning of the pixels of the detector, not a scanning of the beam 14. These points l and k correspond to image spots b1 and b2 of the present application, which latter nomenclature will be used below. In Blais' FIG. 4, the broken line j is a line equidistant between the lines M and N, and the circuit described in FIG. 3 of that patent will determine the pixel positions Pil and Pik corresponding to points l and k. Adopting the nomenclature of the present description these can conveniently be referred to as center line J and pixel positions P(i, b1) and P(i, b2) i.e. the pixel positions corresponding to the image spots b1 and b2 for the scan line i, or P(i', b1') and P(i', b2') for the scan line i'.

Hence the Z coordinate of the point B on the target surface is given by the distance b between image spots b1 and b2 (camera pixels P(i, b1) and P(i, b2)), while the X direction coordinate of the point B is given by the geometric center point Xo on the center line J, i.e. pixel Po, between the image spots b1 and b2, assuming that the projected beam 14 is located as shown in FIG. 2, i.e. equidistant between the apertures 16. See the last two lines of column 5 of the Blais patent, the position of the center point Xo being independent of the Z coordinate, and the center line J being equidistant between the lines M and N.

SUMMARY OF THE INVENTION

The object of the present invention is to provide a technique that simultaneously enjoys at least some of the respective advantages of both the Biris and triangulation systems, while at the same time providing a system that has the further advantage of operating reliably in environments that are more cluttered than either of the prior systems can tolerate.

To this end the invention provides a system that is basically a modification of the Biris system, in that it employs an apertured mask, while at the same time embodying some aspects of the triangulation system, and in addition employs a new approach to the validation of the image spots detected in the camera, i.e. the ability to distinguish between false spots generated by the clutter and those spots that truly represent a selected point on the target surface, e.g. the point B.

In its broad scope, the invention consists of an imaging system comprising means for imaging onto a position sensitive light detector a selected point on a target surface irradiated by at least one light beam (either a laser beam or a beam from an incandescent source) that occupies or traces out a narrow strip, the system including a mask extending perpendicular to an optical axis defined by the imaging system, the mask having at least two spaced apart aperture portions for forming on the detector image spots of the selected point, the range of the selected point being a function of the spacing b between said spots. The system includes means for scanning the pixels of the detector to extract data on the range and location of the selected point, and the direction of irradiation by the light beam is such that this range is also a function of P, where P is the mean pixel position on the detector of said image spots. By equating these two different methods of calculating the range, it can be shown that $P = g(b) + n(\Theta)$, where $g(b)$ is a monotonic function of b, and n is a function of the angle $\Theta$, i.e. the direction of inclination of the light beam to the direction Z, and is a constant when $\Theta$ is fixed. The system includes means for selecting values for b and P that substantially satisfy this equation. These selected values representing the true range and location of the selected point, while any observed values for b and P that do not satisfy this equation are rejected as the result of false signals not coming from the narrow strip of the light beam.

In a preferred embodiment, the invention can be defined as an imaging system having a converging lens system defining an optical axis extending in a direction Z and a position sensitive light detector having a series of pixels extending in at least one direction X perpendicular to the direction Z, the lens system being located to image a selected point on a target surface onto the detector to generate first data on the coordinate of this selected point in the X direction; a mask lying in a plane perpendicular to the Z direction and having aperture means including at least two aperture portions spaced apart from each other in at least the X direction for forming on the detector image spots of the selected point to generate by means of a spacing b between said spots second data on the coordinate of the selected point in the direction Z; means for scanning the detector pixels in the X direction to extract said first and second data for said selected point, the Z coordinate of the selected point being a function of the spacing b; light means, preferably laser means, for irradiating the target surface including the selected point with a beam that occupies or traces out a narrow strip to define a beam plane, the light means being displaced at least in the X direction from a location midway between said aperture portions whereby the Z coordinate of the selected point is also a function of P, where P is the mean pixel position on the detector of the image spots corresponding to the selected point, whereby $P = g(b) + n(\Theta)$, where $g(b)$ is a monotonic function of b and n is a function of the inclination $\Theta$ of the light beam to the direction Z; and means for selecting values for b and P that substantially satisfy this equation, such selected values for b and P representing the true values of the X and Z coordinates of the selected point.

As described in detail below, the mask may have more than two aperture portions and there may be two or more laser or other light beams used simultaneously. These refinements enable the system to obtain additional data on the profile of the target surface, i.e. in the Y direction as well as the X direction. Such an arrangement requires the pixels in the detector to extend in the Y direction as well as the X direction, which is normal in a CCD camera.

BRIEF DESCRIPTION OF THE DRAWINGS

FIG. 4 shows a variant of FIG. 2;

FIG. 5 shows the parts of FIG. 4 seen in the Y direction;

FIG. 6 is a diagram similar to FIG. 3 but for the conditions of FIGS. 4 and 5;

DETAILED DESCRIPTION OF PREFERRED EMBODIMENTS OF THE INVENTION

Figures 1, 2, 3:
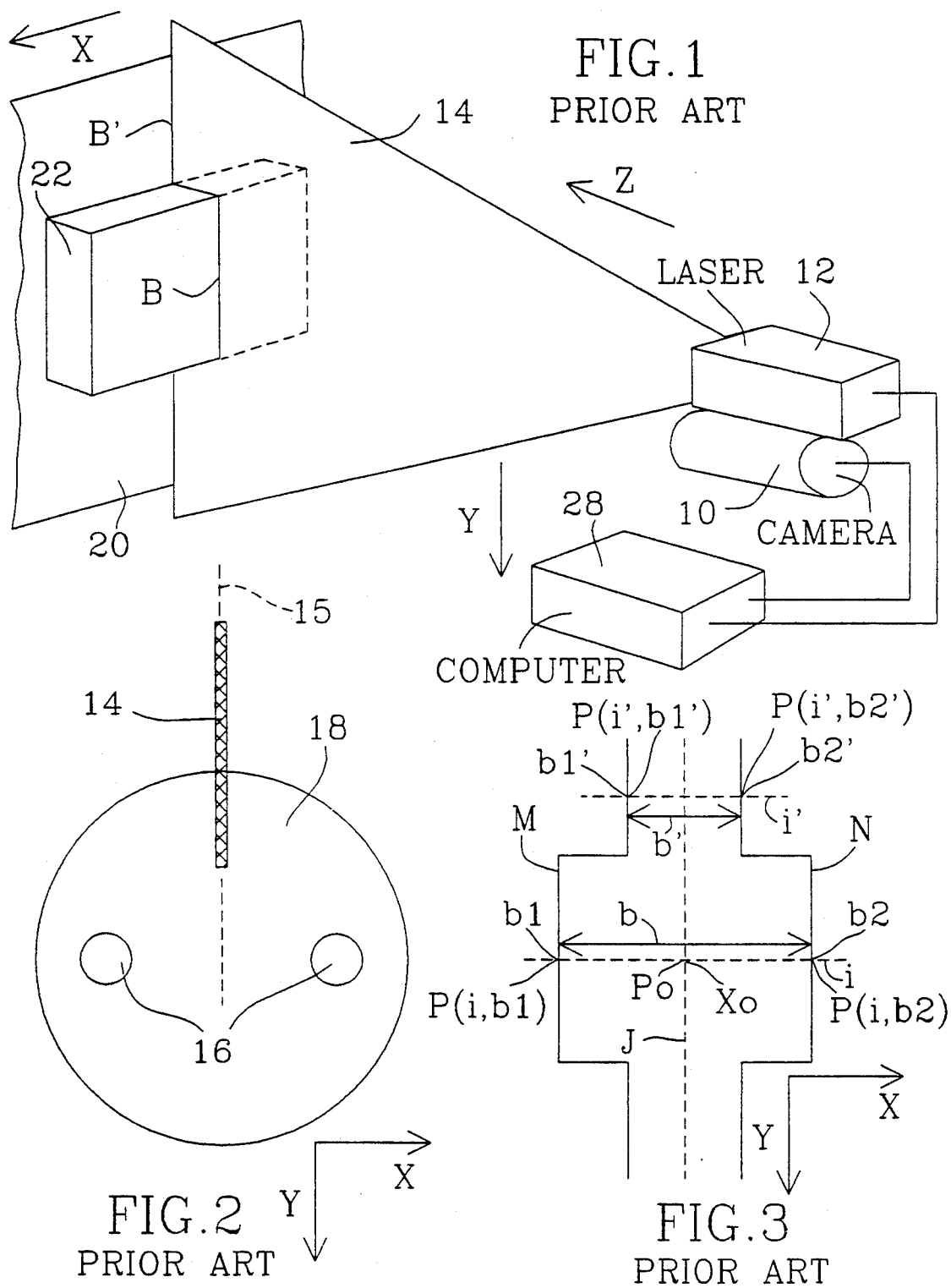
FIG. 1 is a schematic, perspective view of a conventional Biris system.
FIG. 2 is a diagram illustrating the geometric relationship between the laser beam and the mask of this system.
FIG. 3 is a diagram showing the camera image created by the arrangement of FIGS. 1 and 2.

If now the plane 15 of the beam 14 is displaced in the X direction by a distance d, as shown in FIG. 4, while continuing to be directed onto the target surface 20 by inclining it an angle Θ to the Z direction (see FIG. 1 of Blais et al. (88)) and preferably, although not necessarily, lowering it to be horizontally level with the mask 18, the arrangement begins to assume something of the orientation of the triangulation system, while at the same time retaining the apertured mask 18 that is peculiar to the Biris system. FIG. 5 shows that the distance d is measured at the plane 19 of the mask 18, the beam 14 now being inclined to the Z direction at the angle Θ. The detector shown at 13 is the position sensitive detector in the camera. In these circumstances the lines M and N of FIG. 3 become the lines M' and N' of FIG. 6 and the center line J is no longer straight.

The description has so far assumed the existence of only a single target surface in an uncluttered environment, whereas as explained above the basic purpose of the present invention is to provide a system that can distinguish between "true" return signals from the target surface and "false" return signals from surrounding clutter. Such false return signals could be, for example, the result of another light source, the presence of another object onto which light is reflected from the target surface, or the presence of a second laser beam and/or a second range sensor. FIG. 6 shows a third image spot b3 on the scan line i that is representative of such a false signal. In practice, there will often be many more false signals along the scan line i, as well as along the other scan lines, but it is sufficient for the present description initially to consider only one such false spot b3 to demonstrate the manner in which the present invention distinguishes true from false signals.

As already explained, the true coordinate Z of the point B on the target is given by the spacing b between spots b1 and b2. But when the spot b3 also exists, the computer sees three possible values for b, namely $bx = b2 - b1$ (true)

$by = b2 - b3$ (false), or $bz = b1 - b3$ (false)

By the same token, there become three possible values for Po, the correct one of which will give the value of Xo, such values being $Px = \frac{1}{2}(b1 + b2)$ (true)

$Py = \frac{1}{2}(b2 + b3)$ (false)

$Pz = \frac{1}{2}(b1 + b3)$ (false)

As explained in Blais et al. (91) - see equations 1 and 2 on page 2576 of that publication - in a Biris system the coordinate Z is given by $$Z = \frac{1}{L^{-1} - kb} \quad (1)$$

where L is the distance in the Z direction between the mask plane and a theoretical reference plane (not shown but assumed to be displaced from the surface 20 in the Z direction) parallel to and displaced from the mask plane (see FIG. 5 of the Blais patent);

b is as defined above, namely one of the spacings bx, by, etc. between image spots b1, b2, etc.; and k is given by the equation $$k = \frac{L - f}{fDL} \quad (2)$$

where f is the focal length of the lens; and

D is the X direction separation between the two apertures of the mask.

In practice a lens is never perfect and f will vary slightly as a function of the angle of incidence of the incoming light. Therefore k, not being a perfect constant, will be stored as a range of values, typically one value for each scan line.

On the other hand, in a triangulation system, which the FIG. 4 orientation now also resembles, the coordinate Z, as explained in Blais et al (88) equations 1 and 3 on page 227, is given by $$Z = \frac{dl'}{p + l' \tan\theta}$$

and $$l' = \frac{lf}{l - f}$$

Changing p to P and l to L to suit the nomenclature of the present description, it can be shown from these equations that $$Z = \frac{1}{k'P + L'} \quad (3)$$

where P is the pixel position of the imaged spot on the detector;

$$k' = \frac{L - f}{fdL} \quad (4)$$

and $$L' = \frac{\tan\theta}{d} \quad (5)$$

The parameters L, L', k and k' are constants (or, as indicated above, a range of constants) obtained during calibration.

Combining equations (1) and (3) yields $$L' + k'P = L^{-1} - kb \quad (6)$$

or $P = g(b) + n(\Theta)$ (7)

where g(b) is a monotonic function of b, which can also be expressed as a table of constant values as in the previous case, and n is a function of the angle Θ (see equation 5) or a constant for a constant angle Θ.

The foregoing is correct only in respect of a measurement obtained from a target point that is on the laser beam. If a measurement, e.g. the spot b3, has come from a source not on the laser beam, e.g. from another light source or reflected light, then equation (7) is no longer true. Since a false signal is necessarily one that has come from a location onto which the laser beam is not directed, the failure of equation (7) to be satisfied in a specific situation is an indication that the values for that situation are false. This fact can be expressed as $$Px = g(bx) + n(\Theta) \quad (true) \qquad (7x)$$

$$Py \neq g(by) + n(\Theta) \quad (false) \qquad (7y)$$

$$Pz \neq g(bz) + n(\Theta) \quad (false) \qquad (7z)$$

In practice due to noise and equipment imperfections even the first of these equations (7x) will seldom show exact equality, but will be much closer to equality than equation (7y) or (7z), and hence the function of the computer 28 that is connected to receive the camera output will be to select from among these equations the one nearest to equality. The true values for b and P, and hence the true X and Z coordinates of the selected point on the target surface irradiated by the light beam, will then be given by those values that come nearest to satisfying equation (7).

As a result, instead of requiring a constant position for Xo (or Cij) as in the Blais patent (FIG. 4), which in turn requires a light beam that is located in the X direction exactly between the two apertures in the mask as in FIG. 2, it is now possible to have the light projector positioned in a wide variety of locations.

To increase the accuracy ΔZ for a given value of f, the separation d between the beam 14 and the center of the mask 18 should be increased. The subpixel peak detector of the Blais patent, the use of an axicon as disclosed in the Rioux patent, or the use of a mask with an annular aperture (in which case the light beam will be a dot), can all increase the accuracy of the measurement of b. In the case of the single strip laser projection shown in FIG. 4, the main advantage that the triangulation technique contributes to the basic Biris structure results from the opportunity to separate the projector from the camera to an extent much greater than the separation between the mask apertures. In other words, although for convenience of illustration FIG. 4 shows the value of d as only a small amount larger than that for D, improved accuracy is in fact obtained if d is made many times larger than D.

Viewing the present invention as involving a combination of the triangulation technique with the Biris system, a value for δ, the relative contribution of the two methods can be given by $$Z = \frac{1}{\delta(L' + k'P) + (1 - \delta)(L^{-1} - kb)} \qquad (8)$$

In this equation the first term is the contribution of the triangulation method and the second term is the contribution of the Biris method. It has been found that a typical value for δ would be about 0.8, i.e. a ratio of contribution of 80% from the triangulation method and 20% from the Biris method. However, the present invention enables this ratio to be changed to suit various different requirements, the value of δ being determined by the ratio between d and D.

The present invention can involve the use of multiple projectors (lasers) and masks with more than two apertures, the location of the projectors and the number of apertures in the masks no longer being a problem.

Figure 7:
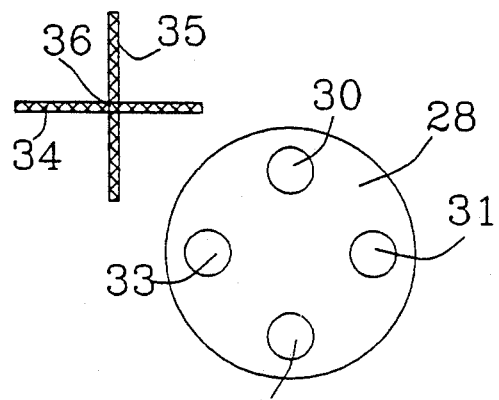
FIG. 7 is a variant of FIG. 4.
Figure 8:
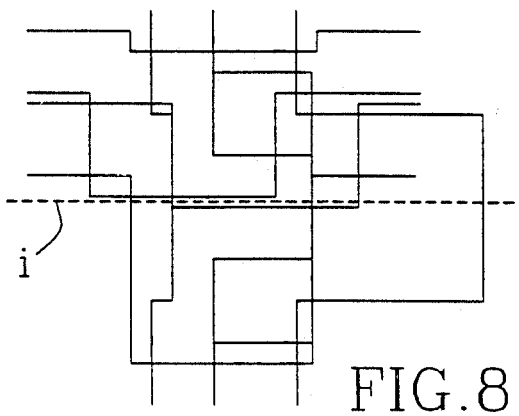
FIG. 8 shows the camera image achieved with the arrangement of FIG. 7.
Figure 9A:
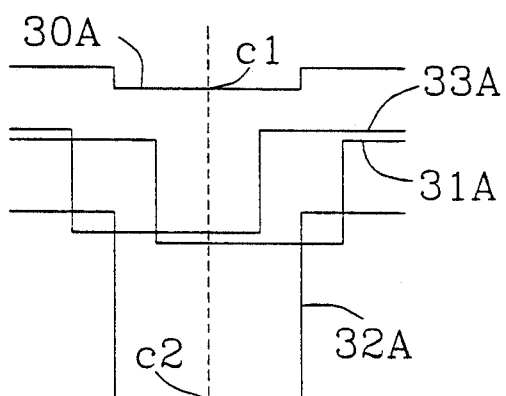
FIGS. 9A and 9B each shows a part of the image of FIG. 8 for ease of understanding.
Figure 9B:
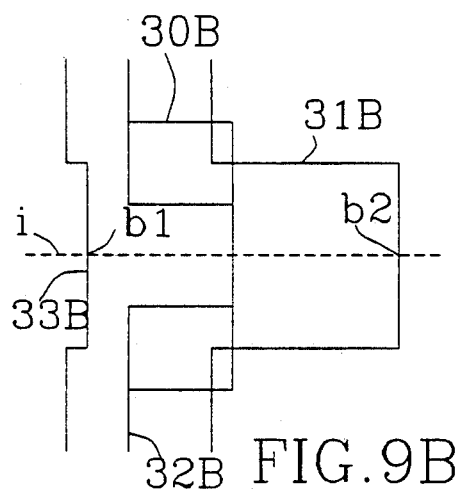

C. A. Keely et al. in European patent application 89312083.2 published May 30, 1990 under no. 370770 disclose the use in a Biris system of a prism for aligning the laser beam exactly with the optical axis of the camera to avoid or minimise the shadow effect. The present invention eliminates any such need by locating the light beam (or beams) offset from the camera's optical axis. Keely et al. used a mask with four apertures. This increase in the number of apertures can be used to advantage in the present invention. FIG. 7 shows a mask 28 with four apertures 30, 31, 32 and 33, and two mutually perpendicular laser beams 34 and 35 having an intersection point 36 that is displaced in both the X and Y directions from the center of the mask. It is not essential that the beams intersect each other. Assuming the same target surface as in FIG. 1, FIG. 8 shows the total resultant image in the camera detector, which for clarity has been shown in two separate parts in FIGS. 9A and 9B, FIG. 9A showing the image produced from the horizontally extending laser beam 34, and FIG. 9B showing the image produced from the vertically extending beam 35. The aperture 30 is responsible for the lines shown at 30A and 30B, and similarly apertures 31, 32 and 33 are respectively responsible for lines 31A, 31B; 32A, 32B; and 33A, 33B. The horizontal portions of the lines 31A and 33A actually lie on top of each other but have been shown in FIG. 9A as slightly separated in order to show their individual shapes. In FIG. 9B the equivalent lines 30B and 32B are shown as they truly are namely with their vertical portions superimposed on each other.

A horizontal scan line i in FIG. 8 will find five image spots of which, as best seen FIG. 9B, the true ones are b1 and b2. By generating the appropriate number of values for b and P (in this case 10—equal to the number of possible combinations of two image spots selected from a total of five) and applying them all to equation (7), the values for b and P that provide the nearest approach to equality in this equation will be selected as the true values, in the same way as has already been explained in connection with equations (7x), (7y) and (7z).

Assuming that the position sensitive detector in the camera is bidimensional in the X and Y directions, as it normally will be, scanning of the pixels in a vertical scan line h (FIG. 9A) will similarly enable identification of true image spots c1 and c2, thus providing the values of b and P in the Y direction. In this way the double beam arrangement of FIG. 7 enables a form of three-dimensional profile of the target surface 20 to be compiled using a fixed camera and fixed beams, i.e. avoiding the need for the relative scanning of the beam 14 and the surface 20 that is required when only a single beam is used. The three-dimensional profile produced in this way is not a complete profile, but it includes range data along strips of the target surface extending in the X and Y directions, which data is often sufficient for many purposes, such as robotics where the purpose is to distinguish the target from other objects of different shapes.

Figure 10:
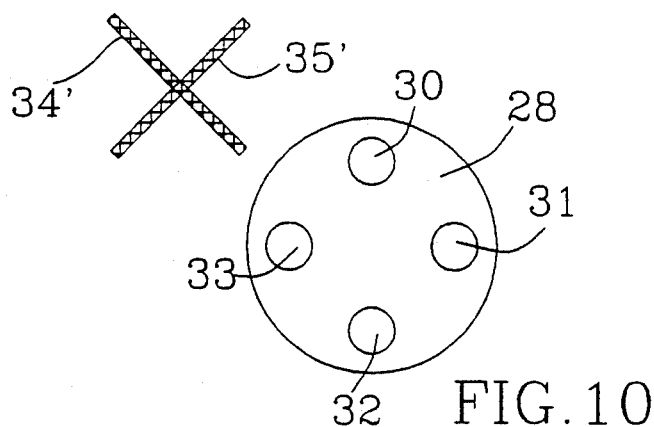
FIG. 10 is a variant of FIG. 7.

FIG. 10 shows that the beams 34', 35' can be tilted. The resultant images will be similar to those shown in Figures 8, 9A and 9B except that the lines forming these images will be inclined to the X and Y directions. They will nevertheless provide the necessary information, namely the true values for b and P when they are scanned by scan lines i and h.

Figure 11:
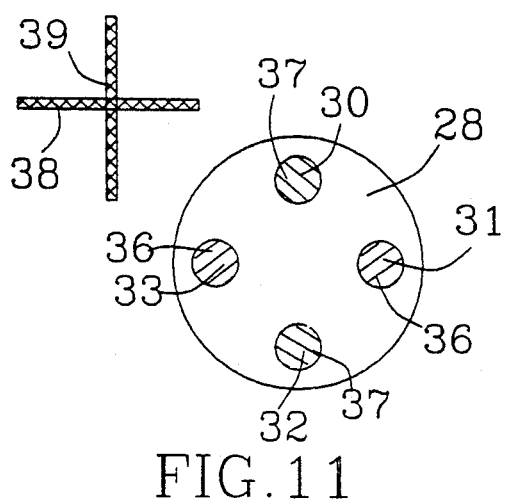
FIG. 11 is a further variant of FIG. 7.
Figure 12:
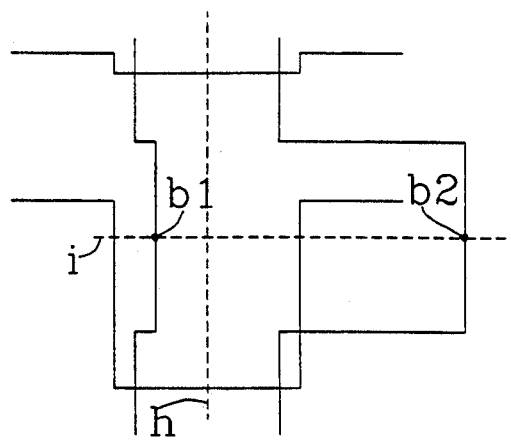
FIG. 12 corresponds to FIG. 8 for the arrangement of FIG. 11.
Figure 13A:
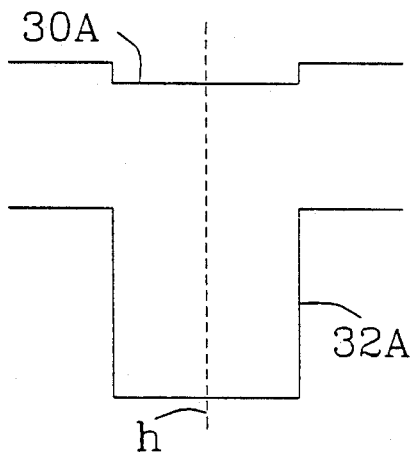
FIGS. 13A and 13B respectively correspond to FIGS. 9A and 9B but for the arrangement of FIG. 11.
Figure 13B:
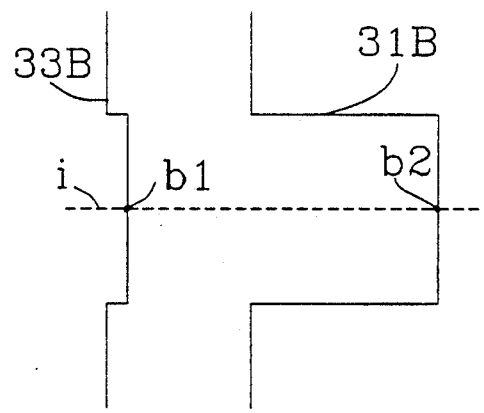

FIG. 11 shows the use of two beams 38 and 39 that are different from each other in some distinguishable characteristic such as wavelength or polarization. The apertures 30-33 in the mask 28 are fitted with appropriate filters, e.g. interference or polarization filters 36 and 37, the filters 36 passing only the beam 39 to cause the apertures 31 and 33 to generate lines 31B and 33B, while the filters 37 pass only the beam 38 to cause the apertures 30 and 32 to generate lines 30A and 32A, as shown in FIGS. 12 and 13A and 13B, thus simplifying the two component images that combine to form the total image in the detector. Each of the images of FIG. 13A or 13B is similar to that of FIG. 6 when only a single beam was employed.

Figure 14:
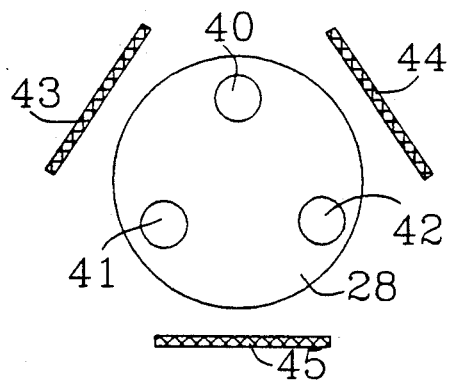
FIG. 14 is a further variant of FIG. 7.
Figure 15:
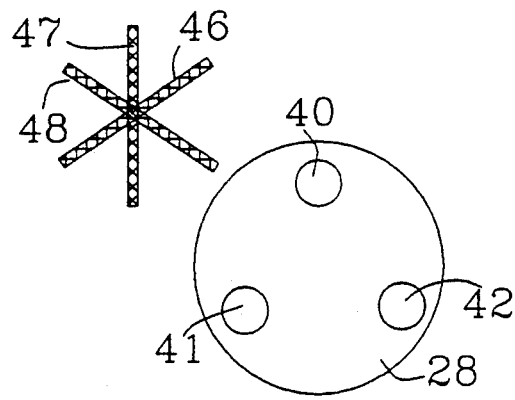
FIG. 15 is a variant of FIG. 14.

FIG. 14 shows a variant in which the mask 28 has three apertures 40, 41 and 42 and three beams 43, 44 and 45, and FIG. 15 shows a modification of FIG. 14 in which beams 46, 47 and 48 intersect each other. The significance of these latter two figures is to demonstrate the flexibility of the system in terms of the numbers and locations of the apertures and beams.

I claim:

1. An imaging system comprising
   (a) means for imaging onto a position sensitive light detector a selected point on a target surface irradiated by at least one light beam that occupies or traces out a narrow strip;
   (b) the imaging means having an optical axis and a mask perpendicular to the optical axis, the mask having at least two spaced apart aperture portions for forming on the detector image spots of the selected point, the range of the selected point being a function of the spacing b between said spots;
   (c) means for scanning pixels of said detector to extract data on the range and location of the selected point,
   (d) the direction of irradiation by said at least one light beam being such that said range is also a function of P, where P is the mean pixel position on the detector of said image spots, whereby $P=g(b)+n(\Theta)$, where $g(b)$ is a monotonic function of b and n is a function of an inclination $\Theta$ of said light beam to the optical axis; and
   (e) computer means for selecting values for b and P that substantially satisfy this equation, such selected values representing the true range and location of the selected point.

2. An imaging system comprising
   (a) a converging lens system defining an optical axis extending in a direction Z and a position sensitive light detector having a series of pixels extending in at least one direction X perpendicular to the direction Z, the lens system being located to image a selected point on a target surface onto the detector to generate first data on the coordinate of said selected point in the X direction;
   (b) a mask lying in a plane perpendicular to the Z direction and having aperture means including at least two aperture portions spaced apart from each other in at least the X direction for forming on the detector image spots of said selected point to generate by means of a spacing b between said spots second data on the coordinate of said selected point in the direction Z;
   (c) means for scanning the detector pixels in the X direction to extract said first and second data for said selected point, the Z coordinate of the selected point being a function of the spacing b;
   (d) light means for irradiating the target surface including said selected point with a first beam that occupies or traces out a narrow strip to define a first beam plane, the light means being displaced at least in the X direction from a location midway between said aperture portions whereby the Z coordinate of the selected point is also a function of P, where P is the mean pixel position on the detector of the image spots corresponding to the selected point, whereby $P=g(b)+n(\Theta)$, where $g(b)$ is, a monotonic function of b and n is a function of an inclination $\Theta$ of the light beam to the direction Z;
   (e) computer means for selecting values for b and P that substantially satisfy this equation, such selected values for b and P representing the true values of the X and Z coordinates of the selected point.

3. An imaging system according to claim 2, wherein the Z coordinate of the selected point on the target surface is given by $$Z = \frac{1}{L^{-1} - kb}$$

and also by $$Z = \frac{1}{k'P + L'}$$

where L, L', k and k' are constants or a range of constants,

L being the distance in the Z direction between the mask plane and a theoretical reference plane parallel to and spaced from the mask plane, k being given by $$k = \frac{L-f}{fDL},$$

f being the focal length of the lens system,

D being the separation in the X direction between the two aperture portions of the mask, L' being given by $$L' = \frac{\tan\theta}{d} \text{ and}$$

k' being given by $$k' = \frac{L-f}{fdL},$$

$\Theta$ being the angle of inclination of the light beam relative to the Z direction, and d being the separation in the X direction at the mask plane between the light beam plane and said location midway between the aperture portions.

4. An imaging system according to claim 2, wherein
   (f) the pixels of said detector also extend in the Y direction and the means for scanning the pixels includes means for scanning them in the Y direction to generate further data on the coordinate of the selected point on the target surface in the Y direction;
   (g) the mask has at least three aperture portions, two of a first pair of which portions are spaced from each other in at least the X direction and two of another pair of which portions are spaced from each other in at least the Y direction; and
   (h) the light means includes means for irradiating said target surface including said selected point with at least one further beam that occupies or traces out a narrow strip to define at least one further beam plane inclined to the first beam plane.

5. An imaging system according to claim 4, wherein the mask has four aperture portions arranged in two mutually perpendicular pairs spaced apart respectively in the X and Y directions.

6. An imaging system according to claim 5, wherein said two beams define planes extend at right angles to each other.

7. An imaging system according to claim 6, wherein the planes of said two beams extend respectively in the X and Y directions.

8. An imaging system according to claim 5, wherein said two beams are different from each other in a distinguishable characteristic, the aperture portions of respective said pairs of aperture portions containing filter means for passing only light with a respective such characteristic.

9. An imaging system according to claim 4, wherein the mask has three aperture portions and the light means irradiates the target surface with three beams occupying or tracing out respective narrow strips extending in mutually inclined directions.

* * * * *